Sept. 7, 1926. 1,599,378
J. T. CHARLESON
METHOD AND MACHINE FOR MAKING A FIBER COMPOSITION
Filed Oct. 2, 1922
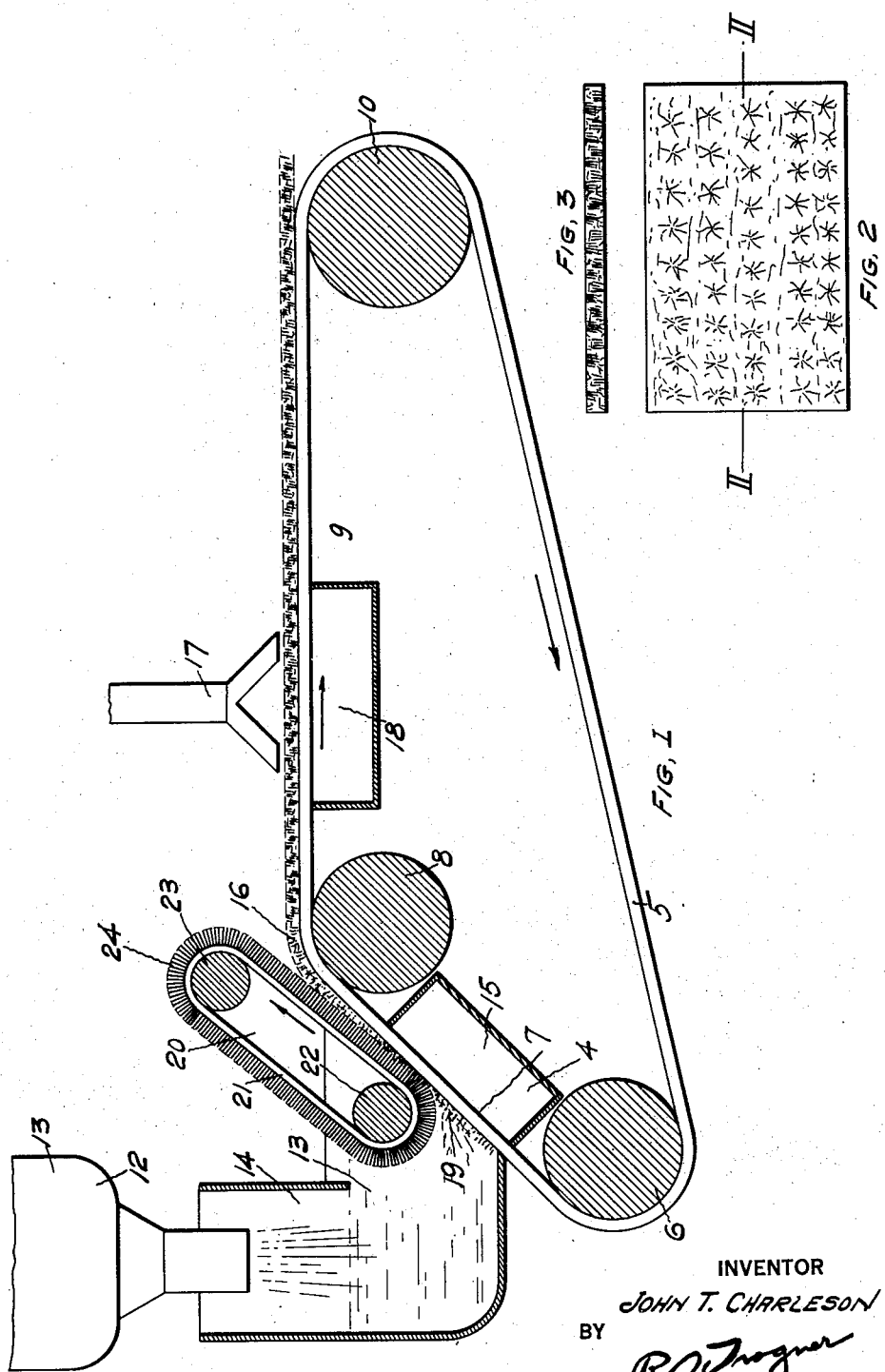
INVENTOR
JOHN T. CHARLESON
BY
ATTORNEY Patented Sept. 7, 1926.

1,599,378

UNITED STATES PATENT OFFICE.

JOHN T. CHARLESON, OF AKRON, OHIO, ASSIGNOR TO THE GOODYEAR TIRE & RUBBER COMPANY, OF AKRON, OHIO, A CORPORATION OF OHIO.

METHOD AND MACHINE FOR MAKING A FIBER COMPOSITION.

Application filed October 2, 1922. Serial No. 591,928.

My invention relates to a novel type of fibrous composition and to a method of, and a machine for, making the same, and it has for one of its objects to provide a fibrous composition in which the fibers are disposed in a plurality of intersecting planes in such manner as to provide a tough flexible material of very great tearing strength and having a good wearing surface.

Another object of my invention is to provide a method of suitably arranging the fibers in a synthetic fibrous composition to provide a material having a maximum of tearing strength in all directions, and having very good wearing qualities.

A further object of my invention is to provide a machine for suitably arranging the fibers so as to cause them to lie in a plurality of intersecting planes.

Heretofore in the manufacture of fibrous material, especially by means of machines of the Fourdrinier type, as commonly used in the manufacture of paper, the fibers are arranged in planes parallel to the wearing surface of the material. Material made in this manner usually offers but little resistance to being torn into layers. Although material having this characteristic is suitable for certain purposes, it is entirely unsuitable for the many purposes for which the material employed, must, of necessity, be tough and not easily separated into layers. For example, material made by this method of manufacture would be unsuitable for the production of synthetic leather or other similar material which might ultimately be used to provide soles for shoes, or the like.

In order to overcome the aforementioned difficulties I have provided a method of, and a machine for, making a fibrous material in which the fibers are not disposed in parallel planes, but instead are disposed in a plurality of intersecting planes, a portion of the fibers being disposed in each of a large number of different directions.

In the accompanying drawings, Fig. 1 is a cross-sectional view of a machine constructed in accordance with my invention;

Fig. 2 is a plan view on a larger scale, of a piece of material formed in accordance with my invention, prior to the compressing operation to which it is subjected; and Fig. 3 is a side elevational view of the material illustrated in Fig. 2, the section being taken along the line II—II thereof.

In the drawing I show a machine 4, of the Fourdrinier type, which comprises a traveling carrier belt or wire 5, which passes over a lowermost pulley 6, through an inclined plane 7, over a pulley 8, through a substantially horizontal plane 9, over a pulley 10 and back again to the pulley 6. The carrier 5 must be porous and composed of a material which will not be affected by any of the liquids employed during the manufacturing operation, through which it carries the material during such operation.

Above the inclined plane 7 is disposed a mixing tank 12 in which is contained a liquid 13, having suspended therein a quantity of separated fibers. A chamber 14, of which that portion of the belt 5, which is in the inclined plane 7, constitutes a side wall, is disposed beneath the tank 12 and receives the liquid 13 therefrom. A suction producing device 15 is disposed beneath and in engagement with the carrier 5 in the inclined plane 7. The suction producing device 15 draws the liquid in which fibers are suspended from the chamber 14 through the belt or carrier 5 in the inclined plane 7, leaving the fibers disposed upon the carrier in a matted formation, as indicated at 16, the fibers being disposed parallel to the wearing surface of the material.

For the particular application for which the material I have invented is intended to be employed, I find that rubber coated fibers are the most desirable. When such fibers are employed the rubber may be precipitated upon the fibers while in the container 12. After being deposited upon the traveling belt 5, it is necessary that these rubber coated fibers be treated so as to remove therefrom any remaining solvent, the presence of which in the rubber would cause the material to deteriorate rapidly by dissolving the rubber and bringing it to the surface. In order to remove this solvent, the fibrous material is treated, while passing through the horizontal plane 9, by means of a spraying device 17 and a cooperating vacuum producing chamber 18. A rubber precipitant is sprayed on the material from the device 17 and any excess precipitant, or any liquid which may be displaced thereby, is absorbed by the suction device 18, thus washing the material, or displacing the rubber solvent therein, and permitting it to pass therefrom in a comparatively dry state.

As the material 16 is passing over the upper portion of the inclined plane 7 it is engaged by a fiber arranging device 20, which consists of an endless belt 21, passing over a pulley 22, disposed partially within the chamber 14 and close to the inclined portion of the belt 5 and a second pulley 23, disposed relatively further away from the belt. The belt 21 is provided with a plurality of pins or projections 24, which project into the material 19 as it passes beneath the pulley 22. On account of the fact that the fibers of the material 19 are wet they tend to cling to the pins 24, which are gradually withdrawn from the material as the belt 24, which moves with the belt 5, passes from the pulley 22 to the pulley 23 and the material passes over the pulley 8. The tendency of the fibers to cling to the pins 24 causes them to be carried thereby to various positions, some of which will be normally to the surface of the material, and others of which will be at all angles of inclination with respect thereto, thus disposing the fibers in a plurality of intersecting planes.

It is essential that the belt 21 and the belt 5 be driven at exactly the same speed, because if one of the belts moves faster than the other, the pins 24 will tend to cut grooves in the material 16, thus injuring it.

Fig. 2 is a plan view on a larger scale of a portion of the material 16 in which the arrangement of the fibers about the points where the pins 24 left the material is clearly indicated. Any opening left by the pin points will be closed when the material is compressed in a subsequent operation. Fig. 3 is a sectional view of the arrangement of the fibers in the material 16.

With this method of manufacture, the rubber or rubber coated fibers, which I prefer to use in practicing my invention, may be cured before admitting the fibers to the container 12, or may be cured subsequently to the rearrangement of the fibers by the mechanism 20. The fibers may be composed of any suitable material, such for example as jute, hemp, wool, cotton, leather, asbestos or the like.

Although I have illustrated but one form of my invention and have described in detail but a single application thereof, it will be obvious to those skilled in the art that it is not so limited, but that various minor changes and modifications may be made therein without departing from the spirit of my invention, or from the scope of the appended claims.

What I claim is:

1. A synthetic fibrous material comprising a quantity of individually rubber coated fibers disposed generally in parallel planes and a plurality of fibers intersecting said planes and secured into a homogenous mass by means of said coats of rubber.

2. The method of making a fibrous material which comprises initially arranging a quantity of fibers in parallel planes and subsequently intermatting the fibrous structure by changing the direction of some of the fibers.

3. The method of making a fibrous material which comprises initially arranging a quantity of fibers in one general direction and subsequently rearranging spaced portions thereof substantially perpendicular to the remainder thereof.

4. The method of making a fibrous material which comprises initially arranging a quantity of fibers substantially parallel to the wearing surface, and subsequently arranging a portion of said fibers in planes inclined to said wearing surface.

5. The method of making a fibrous material which comprises initially arranging a quantity of fibers substantially parallel to the wearing surface, and subsequently arranging a portion of said fibers perpendicular thereto.

6. A machine for making a fibrous material which comprises means for initially arranging the fibers in planes substantially parallel to the exterior surface of the material, and means for subsequently rearranging some of the fibers out of alignment with the plane of the material.

7. A machine for making a fibrous material which comprises means for initially arranging the fibers in a plane substantially parallel to the exterior surface of the material and subsequently rearranging a portion of the fibers in a direction substantially normally to said surface.

8. A machine for making a fibrous material comprising an endless carrier belt for transporting the material, and a second endless belt adapted to move therewith and rearrange a portion of the fibers thereof out of alignment with the plane of the material.

9. A machine for making a fibrous material comprising an endless carrier belt for transporting the material, and a second endless belt adapted to move therewith and provided with projections adapted to engage the material and to rearrange the fibers thereof.

10. A machine for making a fibrous material comprising an endless carrier belt for transporting the material, and a second endless belt adapted to move therewith and provided with projections adapted to engage the material and to rearrange spaced groups of the fibers thereof.

11. A machine for making a fibrous material comprising an endless carrier belt for transporting the material, and a second endless belt adapted to move therewith and provided with projections adapted to engage the material and to cause a portion of said fibers to be arranged substantially perpendicular to the surface of the material.

In witness whereof, I have hereunto signed my name.

JOHN T. CHARLESON.